(12) United States Patent
Weber et al.

(10) Patent No.: US 6,212,213 B1
(45) Date of Patent: Apr. 3, 2001

(54) PROJECTOR LIGHT SOURCE UTILIZING A SOLID STATE GREEN LIGHT SOURCE

(75) Inventors: Andreas G. Weber, Redwood City; Gerd Mueller, San Jose; William R. Trutna, Jr., Atherton, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/240,284

(22) Filed: Jan. 29, 1999

(51) Int. Cl.[7] .............. H01S 3/19; H01L 33/00; H01J 1/62

(52) U.S. Cl. .............. 372/50; 372/43; 257/88; 257/89; 313/500

(58) Field of Search .............. 372/43, 50; 257/89, 257/93, 40, 88, 90; 313/503, 504, 505, 500, 501

(56) References Cited

U.S. PATENT DOCUMENTS

| | | | |
|---|---|---|---|
| 3,877,801 | 4/1975 | McGoevern | 353/38 |
| 4,271,408 | 6/1981 | Teshima et al. | 340/702 |
| 5,424,560 | * 6/1995 | Norman et al. | 257/40 |
| 5,483,085 | * 1/1996 | Holm et al. | 257/88 |
| 5,693,962 | * 12/1997 | Shi et al. | 257/89 |
| 5,866,922 | * 2/1999 | Huang et al. | 257/93 |

FOREIGN PATENT DOCUMENTS

| | | | |
|---|---|---|---|
| 2131589 | 6/1984 | (GB) | G09F/13/00 |
| WO 88/07249 | 9/1988 | (WO) | G09G/3/22 |

* cited by examiner

Primary Examiner—Brian Healy

(57) ABSTRACT

A light source constructed from a two dimensional array of light emitting devices. The light emitting devices include first, second and third types of light emitter. The first type of light emitting device covers a first area in the two dimensional array and emits light in a first region of the optical spectrum. The second type of light emitting device covers a second area in the two dimensional array and emits light in a second region of the optical spectrum, and the third type of light emitting device covers a third area in the two dimensional array and emits light in a third region of the optical spectrum. The first, second, and third areas are chosen such that the simultaneous output from all emitters generates white light. At least one of the emitter types covers an area larger than that covered by the others. In the preferred embodiment of the present invention, the first type of light emitting device includes a light emitting device that emits light at a wavelength less than the wavelength of a green region of the optical spectrum; a color conversion compound absorbs this light and re-emits it in the green region of the optical spectrum.

4 Claims, 1 Drawing Sheet

PROJECTOR LIGHT SOURCE UTILIZING A SOLID STATE GREEN LIGHT SOURCE

FIELD OF THE INVENTION

The present invention relates to light sources, and more particularly, to a solid state light source that emits in the green region of the optical spectrum for use in projectors and the like.

BACKGROUND OF THE INVENTION

Systems for projecting images onto screens are known in the art. Systems based on incandescent or arc lamps are often used in projection displays. However, such sources have limited lifetimes and poor output stability over the life of the light source. In addition, spectral components, such as UV and IR, that are not needed for display purposes must be filtered out of the emissions to avoid damage to other components or the viewer's eyes.

Sources based on combinations of Light Emitting Diodes (LEDs) or semiconductor lasers that emit red, green and blue light can be used as a solid state light source. Since LED and laser emissions are typically spectrally narrow band light sources, the use of color filters for the display can be omitted. Also the optical output of semiconductor lasers and LEDs can typically be electrically modulated at a rate that is sufficient for a time sequential color display. Furthermore most solid state lasers emit linear polarized light which further improves the efficiency of light production and simplifies the optics in projection systems.

Unfortunately, individual solid state light sources do not provide sufficient brightness for many projection display applications; hence, arrays of LEDs must be utilized to obtain sufficient output. In order to provide a full color display, the solid state light source has to include emitters of at least three different colors forming a mosaic emitter pattern. Assuming color independent optical losses in a display application, the area of the LED array that is covered by each kind of emitter has to be adjusted to provide white light when all emitters are active. Hence, the radiance of the LED array is dominated by the lowest occurring radiance of emitters of any color. The composition of the LED array can be adjusted to compensate for color dependent losses in the display application.

Present LED technology provides devices with higher radiance in the red and blue spectral regions than for green light. Further, the spectrum of these high power green LEDs shifts to shorter wavelengths with increasing drive current or output power. This wavelength shift creates color distortions in the image if the LED output power is amplitude modulated in order to provide gray scaling in the image.

Broadly, it is the object of the present invention to provide an improved solid state light source that emits in the green region of the optical spectrum.

It is a further object of the present invention to provide a green light source having a spectral output that does not shift when the output of the light source is altered.

These and other objects of the present invention will become apparent to those skilled in the art from the following detailed description of the invention and the accompanying drawings.

SUMMARY OF THE INVENTION

The present invention is a light source constructed from a two dimensional array of light emitting devices. The light emitting devices include first, second and third types of light emitter. The first type of light emitting device covers a first area in the two dimensional array and emits light in a first region of the optical spectrum. The second type of light emitting device covers a second area in the two dimensional array and emits light in a second region of the optical spectrum, and the third type of light emitting device covers a third area in the two dimensional array and emits light in a third region of the optical spectrum. The relative area covered by emitters of each kind is adjusted to provide white light when all emitters are operating simultaneously. At least one of the first, second, and third types of light emitting devices covers a larger area than the others of the first, second, and third types of light emitting devices. In the preferred embodiment of the present invention, the first type of light emitting device includes a light emitting device that emits light at a wavelength less than the wavelength of a green region of the optical spectrum and a color conversion compound for absorbing the emitted light and emitting light in the green region of the optical spectrum.

DETAILED DESCRIPTION OF THE INVENTION

Figure 1:
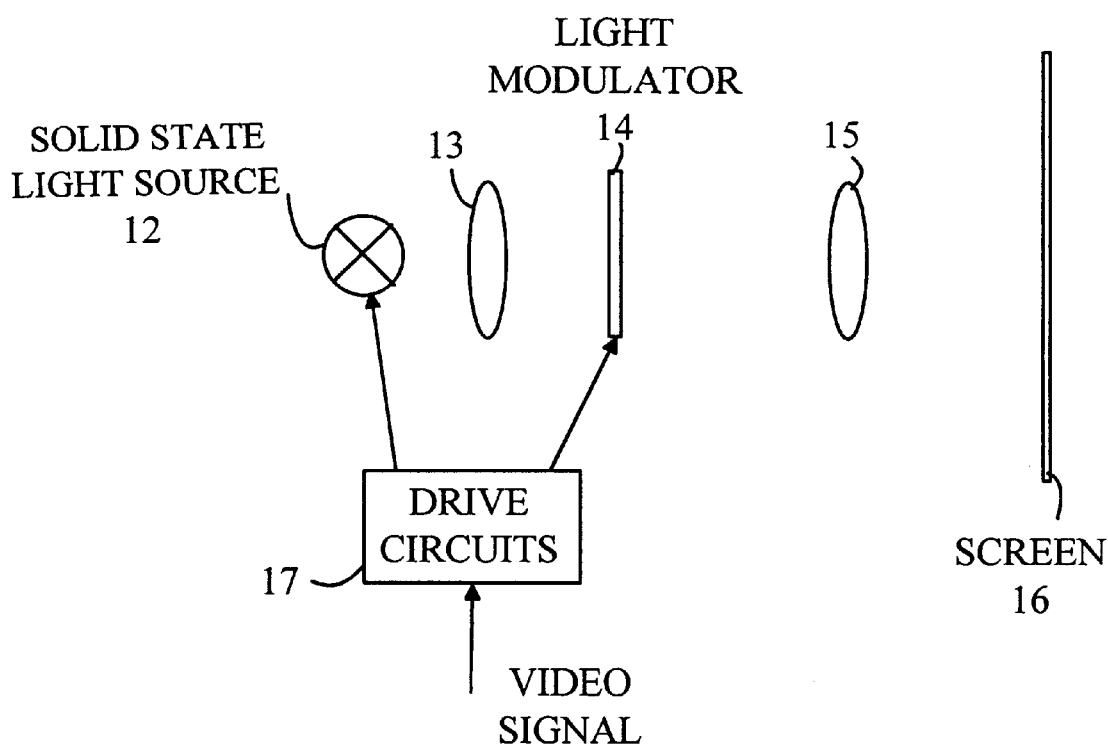
FIG. 1 is a cross-sectional view of a projection system according to the present invention.

The present invention may be more easily understood with reference to FIG. 1, which is a cross-sectional view of a projection system according to the present invention. Projection system 10 utilizes a solid state light source 12 to illuminate a liquid crystal light modulator 14. An optical system 13 is used to efficiently collect light from the source and illuminate the light modulator. The light modulator is imaged onto a screen 16 by an optical system 15. A color image is produced by sequentially displaying red, blue, and green images in a time frame that is sufficiently short so that the eye does not perceive the separate images. The drive circuits shown at 17 decode the component video signals.

As noted above, the light output of individual LEDs or laser diodes is insufficient to provide the required illumination. Hence, light source 12 is constructed from arrays of LEDs or laser diodes. To simplify the following discussion, embodiments based on LEDs will be discussed; however, it is to be understood that similar embodiments based on arrays of laser diodes can also be utilized without departing from the teachings of the present invention. While the optical output power of the light source can be increased by utilizing larger arrays of LEDs, there is a limit to the physical size of the light source.

The useful solid angle and area of the light source are determined by the etendu of the optical system of the projection display. The etendu of an optical element is its aperture multiplied with the solid angle of the light that is relayed through this element. The etendu of a system is the minimum occurring etendu of its individual optical components. Given the etendu of the optical display system and the collection angle of the collimating optics the maximum useful light source area is determined. This area has to be covered with as many solid state emitters of maximum available radiance as possible in order to provide maximum radiance of the light source.

To provide a full color display, a solid state light source has to include emitters of at least three different colors. In order to maximize the brightness of a color display, the relative area covered by emitters of each color has to be adjusted according to the respective emitter radiance. If all emitters are driven simultaneously, the resulting color shining onto the display screen has to be white. The fraction of the source area covered by each kind of color emitter is given by:

$$\frac{A_{ci}}{A_{total}} = \frac{P_{ci}}{D_{ci} * \left(\frac{P_{c1}}{D_{c1}} + \frac{P_{c2}}{D_{c2}} + \frac{P_{c3}}{D_{c3}}\right)} \quad (i = 1 \ldots 3) \qquad (1)$$

Here, c1, c2, and c3 denote the three spectral emitters, $P_{c1}$, $P_{c2}$ and $P_{c3}$ denote the total optical power required for each emitted color c1, c2 and c3, respectively, to generate white light at the display screen. $D_{c1}$, $D_{c2}$ and $D_{c3}$ are the emitted power/area of the individual solid state color emitters that reach the display screen. Finally, $A_{ci}/A_{total}$ (i=1 . . . 3) is the fraction of the total source area that is covered by the emitters of one color. Hence, the mosaic pattern must accommodate different individual emitter dimensions. Furthermore the pattern of the individual solid state color emitters must provide good mixing of the different color emitters in order to maximize the uniformity of illumination at the light valve of each individual color. As noted above, green emitting LEDs typically have lower radiance then blue LEDs. Hence, the area devoted to green LEDs must be increased at the expense of the other colors.

Figure 2:
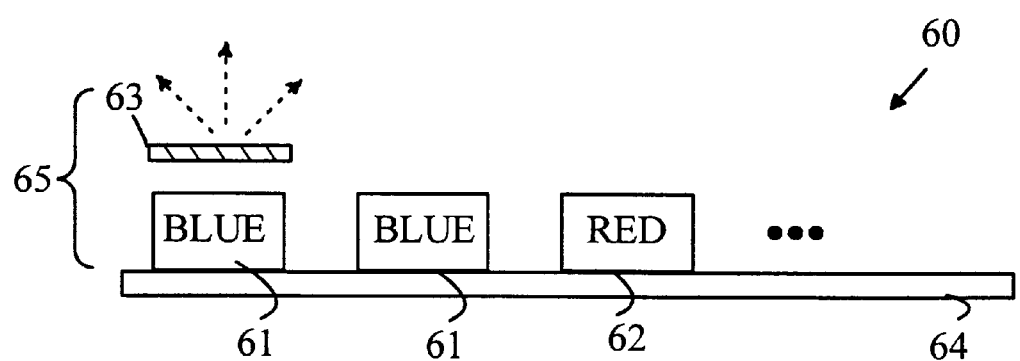
FIG. 2 is a cross-sectional view of a light source according to the present invention.

The present invention provides increased green light output by utilizing color conversion. As noted above, current LED technology provides devices with higher radiance in the red and blue spectral regions than for green light. Hence, the radiance in the green region can be improved by using a highly efficient phosphor or dye that is excited with blue light and emits green light. An embodiment of the present invention utilizing such a conversion phosphor is shown in FIG. 2. FIG. 2 is a cross-sectional view of a light source 60 according to the present invention. The array of emitters is constructed from blue emitters shown at 61 and red emitters shown at 62. An appropriate fraction of the blue emitters is covered by a green phosphor layer 63, which converts the blue light to green light to form a green light source 65. The emitters are preferably mounted on a heat sink 64. The relative areas of the emitters are adjusted as described above.

As noted above, arrays of lasers are also known to the art. Inexpensive semiconductor lasers (edge emitters or VCSELs) with appropriate output power to illuminate a projection display are not available yet. However their beam properties and the fact that the light is normally linear polarized will make them attractive light sources for displays.

In addition to providing a higher radiance green source, a converted blue source solves the problems associated with the spectral shifts observed in green LEDs as the output power is increased. As noted above, at present the output of high power green GaN LEDs shifts to shorter wavelengths with increasing drive current or output power. The wavelength shift creates color distortions in the image if the LED output power is amplitude modulated in order to provide gray scaling. If the green light is created by converting blue light by means of a dye or phosphor, the green spectral output of the converted source will not shift with a change in its optical output power. A phosphor such as Strontiumthiogallate ($SrGa_2S_4:Eu^{2+}$) may be utilized for this purpose. Also, a dye such as Coumarine 515 that is utilized in the fabrication of lasers may also be utilized.

Various modifications to the present invention will become apparent to those skilled in the art from the foregoing description and accompanying drawings. Accordingly, the present invention is to be limited solely by the scope of the following claims.

What is claimed is:

1. A light source comprising a two dimensional array of light emitting devices, said light emitting devices comprising:

a first type of light emitting device covering a first area in said two dimensional array and emitting light in a first region of the optical spectrum, a second type of light emitting device covering a second area in said two dimensional array and emitting light in a second region of the optical spectrum, and a third type of light emitting device covering a third area in said two dimensional array and emitting light in a third region of the optical spectrum, wherein said first, second, and third areas are chosen such that simultaneous output from all emitters generates white light, and wherein at least one of said first, second, and third areas differs from another of said first, second, and third areas.

2. A light source comprising a two dimensional array of light emitting devices, said light emitting devices comprising:

a first type of light emitting device covering a first area in said two dimensional array and emitting light in a first region of the optical spectrum, a second type of light emitting device covering a second area in said two dimensional array and emitting light in a second region of the optical spectrum, and a third type of light emitting device covering a third area in said two dimensional array and emitting light in third region of the optical spectrum, wherein said first, second, and third areas are chosen such that simultaneous output from all emitters generates white light, and wherein at least one of said first, second, and third areas differs from another of said first, second, and third areas, and wherein said first type of light emitting device comprises a light emitting device that emits light at a wavelength less than the wavelength of a green region of the optical spectrum and a color conversion compound for absorbing said emitted light and emitting light and emitting light in said green region of the optical spectrum.

3. The light source of claim 1 wherein one of said light emitting devices is a LED.

4. The light source of claim 1 wherein one of said light emitting devices is a laser.

* * * * *